United States Patent
Cimino

(10) Patent No.: US 8,573,402 B2
(45) Date of Patent: Nov. 5, 2013

(54) REUSABLE DISPENSING RECEPTACLE SYSTEM WITH PRESERVATIVE ATTRIBUTES

(76) Inventor: J. Jay Cimino, Glenview, IL (US)

( * ) Notice: Subject to any disclaimer, the term of this patent is extended or adjusted under 35 U.S.C. 154(b) by 190 days.

(21) Appl. No.: 13/107,926

(22) Filed: May 15, 2011

(65) Prior Publication Data

US 2011/0284419 A1 Nov. 24, 2011

Related U.S. Application Data

(60) Provisional application No. 61/395,810, filed on May 18, 2010.

(51) Int. Cl.
*B65D 81/20* (2006.01)

(52) U.S. Cl.
USPC ........................................................ 206/524.8

(58) Field of Classification Search
USPC ............................ 206/524.8; 53/403, 405, 79
See application file for complete search history.

(56) References Cited

U.S. PATENT DOCUMENTS

| | | | |
|---|---|---|---|
| 203,180 A | 4/1878 | Miller | |
| 1,818,924 A | 8/1931 | Aronseag | |
| 1,990,918 A | 2/1935 | Benjamin | |
| 2,227,172 A | 12/1940 | Raymond | |
| 3,169,654 A | 2/1965 | Heinrich | |
| 3,256,977 A * | 6/1966 | Pettersen | 206/216 |
| 3,696,969 A | 10/1972 | De Van | |
| 4,392,578 A | 7/1983 | Fipp | |
| 4,429,811 A * | 2/1984 | Bakeman | 222/159 |
| 4,684,033 A | 8/1987 | Marcus | |
| 4,723,674 A | 2/1988 | Nunes | |
| 4,763,803 A | 8/1988 | Schneider | |
| 4,938,377 A * | 7/1990 | Jarvis | 220/216 |
| 5,215,129 A | 6/1993 | Berresford | |
| 5,299,408 A | 4/1994 | Dupont | |
| 6,290,105 B1 | 9/2001 | Cosentino | |
| 6,637,321 B2 | 10/2003 | Wang | |
| 6,886,605 B2 | 5/2005 | Luis | |
| 6,913,167 B2 | 7/2005 | Phelps | |
| 7,533,701 B2 | 5/2009 | Gadzic | |
| 8,069,987 B2 * | 12/2011 | Choy et al. | 206/524.8 |

* cited by examiner

*Primary Examiner* — Luan K Bui
*Assistant Examiner* — Rafael Ortiz

(57) ABSTRACT

This invention relates to containers for the storage and dispensing of materials which evaporate, deteriorate or oxidize when exposed to air. A reusable dispensing receptacle system with preservative attributes is comprised of four essential components. The invention by combination includes a vessel, a follower or partition to separate contents from direct exposure to convecting ambient void air within the vessel, a volumetrically adjustable insert to displace ambient air from the vessel, and a lid. The system is simple in construction, and intuitive in use. The system is easily handled and is intended for use in any setting. The system provides a solution for extending the freshness and usability of liquid or pour-able dry contents after the seal of an original package has been broken. This combination eliminates convoluted, intricate, and costly means in favor of those that are reliable, simple, re-usable, and affordable. These four components may be combined to further simplify the invention.

15 Claims, 6 Drawing Sheets

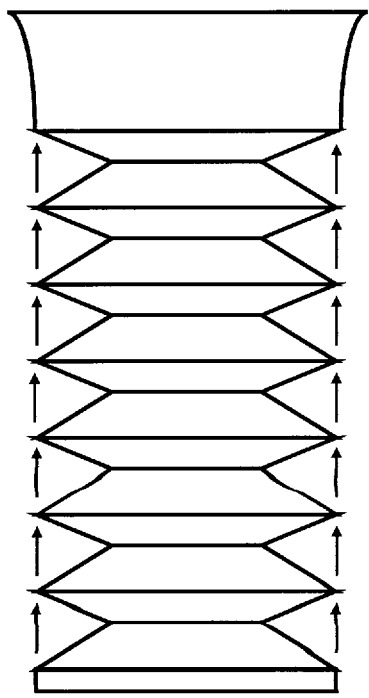
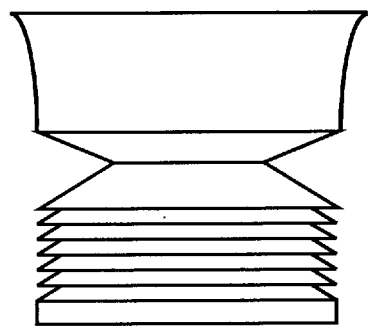
FIG. 8
FIG. 7

REUSABLE DISPENSING RECEPTACLE SYSTEM WITH PRESERVATIVE ATTRIBUTES

CROSS-REFERENCE TO RELATED APPLICATIONS

This application claims the benefit of provisional patent application Ser. No. 61/395,810, filed 2010 May 18 by the present inventor.

FEDERALLY SPONSORED RESEARCH

Not Applicable

SEQUENCE LISTING

Not Applicable

BACKGROUND

1. Field

This application relates to an aesthetically non-objectionable, re-usable, dispensing receptacle system as a means for extending the freshness and usability of pour-able contents beyond what would be experienced if the contents were to have been stored in some rigid or semi-rigid opened original packaging.

2. Prior Art

Most food products, liquids, and chemicals are stored in original packaging sealed containers until initial use. These containers are primarily intended for shipping, marketing and storage of the contents. These containers offer various levels of effectiveness in preserving the contents from chemical and physical changes that would degrade usefulness. However, once any original seal is broken, most contents will begin to degrade. Additionally, contamination from environmental particulates, microbes, insects, etc., becomes a cause for concern. One example of chemical change is oxidization. It is well known that vitamins in freshly extracted vegetable juices suffer rapid deterioration when the juice is exposed to ambient air for even a few hours. Dry food products such as spices, herbs, coffee, tea leaves and such, lose flavor and aroma over time as a result of simple exposure to air. Food products containing essential oils, such as pine nuts, will readily turn rancid as the delicate oil from the nuts interacts with void air within a partially dispensed jar. Physical factors such as changes in humidity are another cause for degradation of usefulness.

Liquids that emit noxious or dangerous fumes when exposed to air, or are readily evaporative would benefit from limiting the surface area exposed to air and decreasing the time period for each occurrence of exposure. In some circumstances, exposure to the UV rays of daylight will have an adverse effect upon the contents. For this reason, we see many containers that are opaque, or tinted in color. Another effect of exposure to ambient air is natural fermentation. Sugar, oxygen and yeast (present upon the skin of the food from which the juice was extracted) naturally convert to alcohol and carbon dioxide ($CO_2$). Fermentation itself can be a natural means of preservation. However, fermented juice, commonly referred to as wine, will suffer spoilage by changing into vinegar in as little as one weeks time.

Few original packaging containers address storage problems related to infrequent, repeated, or small quantity dispensing. Being utilitarian, most original container designs and graphics are directed toward durability and marketing and not tabletop appearance. It is therefore common practice to transfer contents from an original package into a storage receptacle or a service vessel. Ease of use is a desirable property of receptacles designed for dispensing small quantities of some contents. This application is related to presentable dispensing receptacles that can extend freshness and usefulness for weeks, and in some cases months at room temperature beyond the typical time period of an opened original container.

Because opened wine is a notoriously volatile substance which degrades rapidly, it provides an excellent benchmark for development of storage, dispensing and preservation methods in general. To date, over 450 patents have been granted for inventions that relate to wine preservation alone. Many more have been granted for inventions related to the storage and preservation of other products in general. The need for, and usefulness of, inventions addressing this topic is not in question. The pursuit of viable solutions continues. Evolution in material science and manufacturing techniques allow for possibilities which were impossible in the past.

Four basic approaches in prior art can be found from analysis of patents that have been previously granted for the purposes stated. Chemical preservatives aside, these approaches employ the use of a vacuum, the introduction of some inert gas, partitioning the product from air by the use of a bladder, or the employment of a follower as a means of partitioning contents within a container or receptacle. Although each of these approaches posses merit, for the intended scope of this application, they also have shortcomings.

Vacuum—U.S. Pat. No. 4,763,803 to Schneider, Bernardus J. J. A. (1988) has met with enormous commercial success for short term preservation. Experience with this product however, was disappointing, and led to the embodiments presented in this patent application. Although simple to use and inexpensive, the storage duration for a half-full bottle of red wine held at room temperature is no more than 7 days, and less for smaller quantities wine being stored in the original bottle due to increased ratios of air to product. Internet critics state that after a number of days, air finds its way back into the bottle and must be pumped out again. This may be due to the effects of aging of the stopper material and/or the inefficiency of the hand pump used. A superior vacuum force could be employed with the patented "stopper", but care must be taken to avoid bottle implosion. While motorized vacuum devices employing some pressure control mechanism would certainly be more effective than a simple hand pump, the additional cost and complexity of those receiving patents have not found favor in the consumer market, whereas the hand pump, though limited in effectiveness, has achieved success. An example of a motorized pump is seen in U.S. Pat. No. 5,215,129 to Berresford, Richard and Man, David T. (1993).

Inert Gas Introduction—Many patents have been issued for preservation devises that depend upon the introduction of an inert gas to act as a barrier between wine (specifically) and ambient air. It cannot be disputed that this method of preservation has the potential to be very effective for long term preservation. U.S. Pat. No. 6,913,167 to Phelps et al. (2005) is one such example. Unfortunately, the apparatus is quite complicated and therefore quite expensive. While achieving acceptance at wine bars and other commercial establishments, it is far from the reach of most consumers from a cost standpoint. Recently, simple canisters of inert gas have been marketed for use by the average consumer. However, availability of these canisters at a retail level is limited. It has become accepted that the introduction of inert gas requires the use of an additional product for best results. The Wine Enthusiast, a leading authority on wine and wine related products, concluded that this additional product is a bottle closure that creates a seal. The reason for this may be related to damage a cork may experience due to age, quality or damage by cork screw removal. The gas must be re-introduced each time the container has been opened for dispensing. Many cooking recipes call for only an once or two of wine—the balance of the bottle must be stored. French cuisine calls for the use of numerous wines according to the recipe being prepared. Sauterne, Port, Sherry, and the like may be used infrequently for de-glazing a sauté pan, and quantities may be as little at an ounce or two. Over time, the frequent use of inert gas may prove costly.

Bladder—Conceptually, the use of an expandable or collapsible bladder as a means to separate contents from air is very sound. This method has been successfully used for decades by dairy companies serving milk in institutional settings and by the Franzia winery. This method is clearly illustrated in U.S. Pat. No. 3,696,969 issued to De Van et al. (1972). This method of preservation is implemented in the packaging process and does not address re-usability or adaptability on a consumer level for other than originally purchased products. More specific to wine preservation is U.S. Pat. No. 4,392,578 issued to Fipp, Beverly A., Fipp, Bernard E. and Haller, John L. (1983). This patent requires a means for pumping air into the bladder, forcing the bladder to expand against the contents. In this manner, the contents are both separated from ambient air, and are urged out of the container. However, this quite complicated system requires the implementation of a number of valves as well as a non-reusable pressure supply. There is no claim referencing potential re-usability of this system. Perhaps this is due to the bladder materials potential to stretch out of shape after a single use, much the way a balloon does after it has been expanded for a number of days. Ultra flexible materials rely on chemical components to ensure flexibility. The use of these chemicals suggests the possibility of changing the flavor or aroma of the contents due to contact with the bladder. There is limited commercial acceptance of this concept, but none at the consumer level.

Follower—A patentability search revealed follower patents issued as far back as the 1870's. U.S. Pat. No. 203,180 to Miller, J. (1878) is the earliest such patent. The single claim of this patent expressly states that the floating cover be "substantially as described". The description specifically states that the follower is "provided with one or more suitable air vents". Claims in this current application eliminates these air vent element(s), thus negating possible infringement. Also of note is U.S. Pat. No. 1,990,918 to Ramsden, Benjamin (1932). This patent is very closely related to this application, claiming a float upon the surface of a liquid. The stated purpose in each claim specifically addresses the prevention of the formation of scum that might form on the surface of milk held in a receptacle for dispensing. This application does not address, nor is it concerned with the formation of "scum" on the surface of milk. However, the description of the relationship of the float and the vessel is identical to this application. U.S. Pat. No. 2,227,172 to Bainton, Raymond (1940) repeatedly, and without exception, claims a slit in the partition. The buoyant follower in this application eliminates this slit. U.S. Pat. No. 3,256,977 to Gunnar, Nimrod, Pettersen and Askim (1966) also claims a buoyant follower for similar usage. However, this patent was issued with claims of a "filled container" that has a restricted neck and a shoulder. The vessel in this application may be a filled container in some embodiment due to obviousness, but the container claimed eliminates the shoulder and neck elements. In practice, the use of a "floating cover" or buoyant follower, as a sole means of preservation proved quite limited in effectiveness, and is therefore problematic. This could explain why such a simple means of preservation have not been employed in containers, vessels, or closure solutions in current use. It was found that if the follower corresponds too closely to the inner wall of the vessel, the contents will evaporate in this gap. A crust will form in the gap and adhere to both the vessel wall and the follower. This crust will arrest the movement of the follower, impeding ready dispensing of liquid contents. Breaking the crust-seal causes the follower to move uncontrollably within the vessel, possibly causing the contents to splash out of the vessel. If the contents were red wine, and the surface on which the vessel is placed happened to be a table cloth, the resulting stain would curtail further use of the device. These followers may well serve the purposes of the specifications which support their specific claims, but are seriously limited beyond those specifications, even if the claims suggest broader usefulness.

Experience with the above methods, particularly the Vacu-Vin product, U.S. Pat. No. 4,763,803, as issued to Schneider, Bernardus J. J. A. (1988), revealed that a combination of more than one approach, with modifications, promised to provide acceptable results. Simple displacement of the air, proved simpler and at least as effective as evacuating the air using a hand pump. Due to the risks of implosion, displacement was deemed safer and more appropriate for vessels with thinner walls and larger openings. Finally, displacement eliminates the need for some additional, separate pumping apparatus.

To date, hundreds of patents that relate to containers, closures and receptacles have been issued. The use of a receptacle is chosen for practical and aesthetic reasons. Many receptacles address ease of handling, others address the efficient, repeated dispensing of the contents. Some receptacles provide preservative attributes. Receptacles may be selected because they are more suitable for table presentation of some food or beverage. Prior art, while focused on specific inefficiencies, often fails to address simplicity and sensitivities. It is not necessary to indefinitely preserve contents that are intended for use. It is desirable to provide a means capable of addressing all of the aspects of usage, within a scope that is comprehensive, reasonably efficient, re-usable, marketable, balanced and simple. Prior art has failed to meet these combined goals.

SUMMARY

After an original container is opened, it may be practically or aesthetically desirable to transfer the contents into some other storage and serving receptacle. By definition, such a vessel is meant to facilitate dispensing. The qualities of a dispensing vessel may vary with use or setting, but can rarely be employed to preserve the contents to be dispensed. This is especially true if the contents are liquid. Accordingly, much of the specification that follows will focus upon liquid contents. Using a new combination of elements made possible by advanced manufacturing techniques and materials science, the reusable dispensing receptacle system with preservative attributes presents many improvements in concept and in practice. The invention introduces two elements into a vessel that communicates with a re-sealing cover. One element, is an Adjustable Void Air Displacement Insert, A.K.A. "AVADI", the other element is a Contents Partitioning Element A.K.A. "CPE". The AVADI is molded or blow molded from semi-flexible food grade plastic. It is selectively re-adjustable in a precise and predictable manner for the purpose of displacing void atmosphere within the vessel above any contents. The CPE acts as a moveable partition within the vessel for the purpose of separating contents from inevitable remaining atmosphere. Embodiments of the CPE vary with the pourable contents to be partitioned (liquid, moist or dry). To function properly, the CPE must be an imperfect sealing means while the AVADI, (similar to most applied vacuum) cannot completely remove all void atmosphere. However, within a re-sealable vessel, the AVADI and the CPE work together to achieve the desired results. Using passive means of preservation simplifies and therefore promotes usage of both the system and the contents. The need for non reusable or consumable elements is eliminated. An external apparatus for removing air is eliminated. Procurement and deployment of inert gas is eliminated. Intricate mechanical closures or complicated container bodies become needless. The numerous materials that may be used to produce the system allow for variances in appearances that are limited only by the imagination.

DRAWINGS

Figures

FIG. 7 is an elevation view depicting a fully extended insert 6.

FIG. 8 is an elevation view depicting a fully collapsed insert 6.

DETAILED DESCRIPTION OF THE INVENTION

Figure 1:
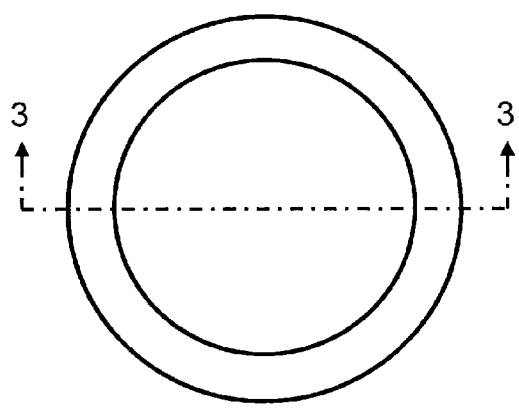
FIG. 1 is a plan view of the sealed receptacle system in accordance with the invention.

For clarity, the embodiments of the elements illustrated represent the simplest examples of manufacture and communication. It would be obvious to anyone of ordinary skill in the art that any number of substitute materials or specific methods of communication could be made. These substitutions would not cause a departure from the spirit and scope of the invention as this flexibility is intended. In the following descriptions, the AVADI will be termed; insert, the CPE for liquid contents will be termed; follower and the CPE for dry contents will be termed; partition. "Cover" and "lid" shall be deemed synonymous. The present invention by combination, its objects, features and advantages will become apparent upon reading the following detailed descriptions in conjunction with the accompanying drawings of one embodiment in which:

FIG. 1 is a plan view of the system. Only the top surface of the snap-fit lid 7 is visible.

Figure 2:
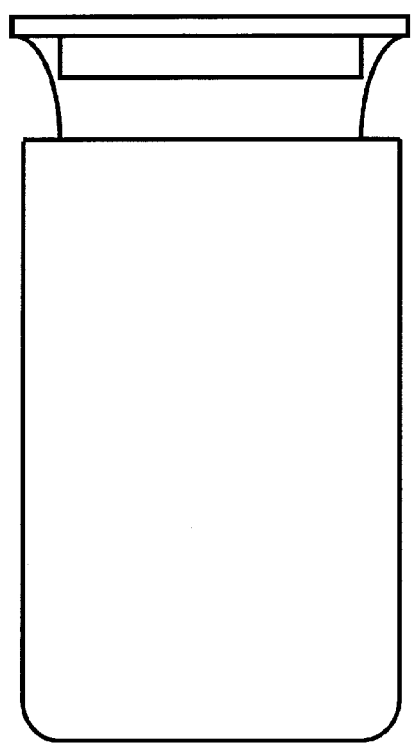
FIG. 2 is an elevation of a sealed receptacle system without the adjustable insert 6.

FIG. 2 is an elevation view depicting an empty rigid vessel 1 used as a receptacle, to store and dispense liquid or pourable dry contents. The vessel 1 may be constructed from glass, lead crystal, plastic, ceramic, metal, or other suitable non-permeable material, or material combination. The vessel 1 material should be considered "food grade" under FDA regulations. The body portion of this open top vessel 1 is configured predominately with smooth, vertical, parallel walls. The vertical cross-section is symmetrical. The upper portion of the vessel 1, toward the opening, is outwardly curved, or excurvate. The excurvated portion will support the insert 6, and arrest its position within the vessel 1. The lid 7 is illustrated protruding into the void area of the vessel 1. An optional sleeve 8 is depicted in this illustration. Due to it's location upon the vessel, the sleeve is a means to assure a positive grip upon the vessel to ensure ease of handling.

Figure 3:
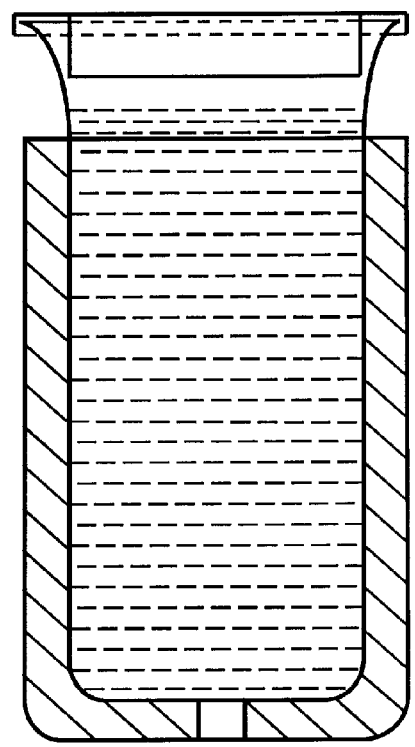
FIG. 3 is a lateral cross-sectional view of FIG. 1.

FIG. 3 is a vertical cross sectional view through FIG. 1 in the same configuration as depicted in FIG. 2. Liquid contents are visible in this illustration. Also visible, is a suction relief vent at the bottom, center of the optional sleeve 8.

Figure 1A:
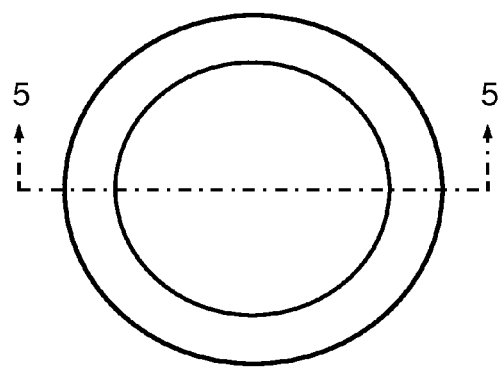
FIG. 1a is a plan view of the sealed receptacle system in accordance with the invention.

FIG. 1a depicts an alternate embodiment whereby the horizontal cross section of vessel 1 is not round.

Figures 4, 5:
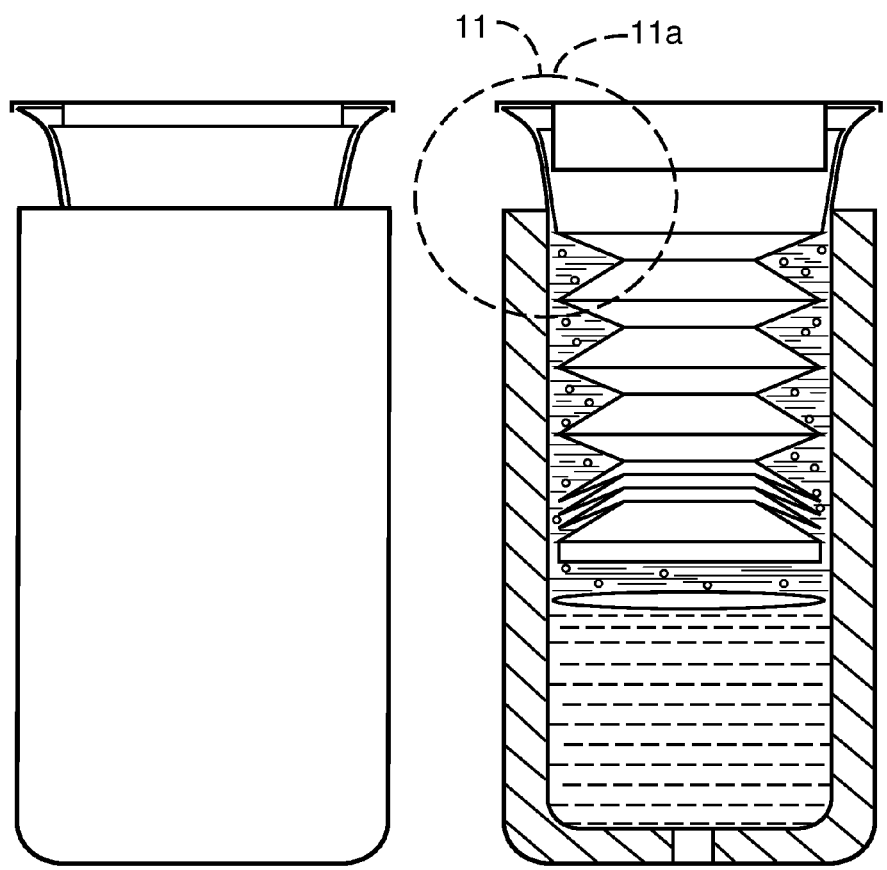
FIG. 4 is an elevation view of one embodiment, including an option a sleeve.
FIG. 5 is a lateral cross section of the main embodiment for liquid contents, including the optional sleeve 8.

FIG. 4 is an elevation view depicting the vessel 1, the lid 7, the insert 6, and the optional sleeve 8.

FIG. 5 is a vertical cross sectional view through FIG. 1a. In addition to the elements depicted in FIG. 4, the follower 2 is shown atop the contents.

Figure 6:
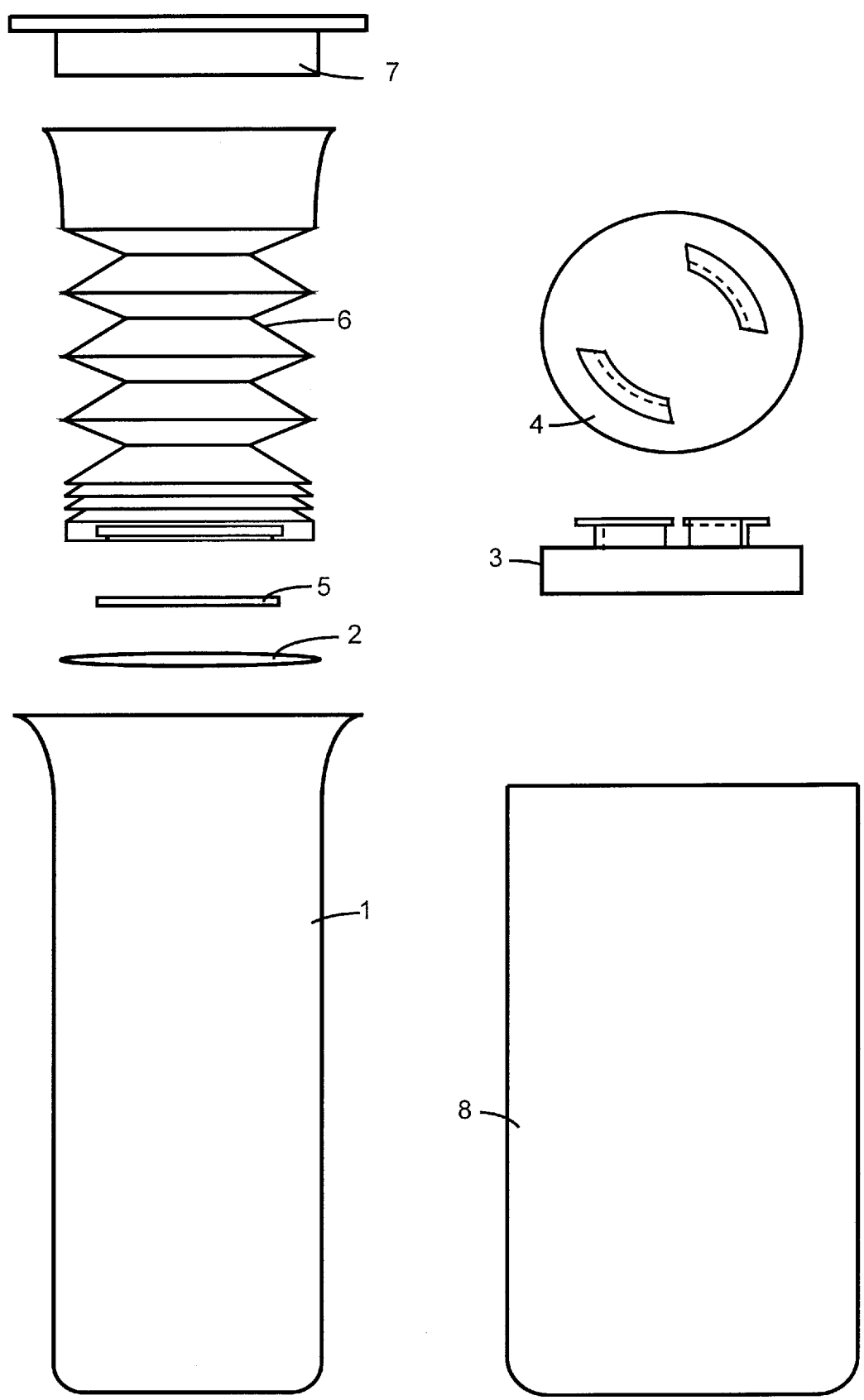
FIG. 6 is an elevation view depicting each individual component of the receptacle system, including the optional sleeve 8, and a plan view of the partition 4 for use with dry contents.

FIG. 6 is an elevation view of each of the essential and optional elements of the system. Included in this illustration are the follower 2 (for liquid contents), and a partition 3 (for dry pour-able contents) which would be introduced into the vessel 1 to isolate the contents from direct exposure to the air above. The follower and partition are constructed from glass, lead crystal, plastic, ceramic, or other suitable non-permeable material, or material combination. These materials should be considered "food grade" under FDA regulations. The follower 2 used for liquid contents is buoyant, and may be hollow. The follower 2 is comprised of two substantially convex surfaces that would promote buoyancy and the sheeting of any liquid contents from whichever surface may be upward facing. The partition 3 used for dry contents is substantially piston-shaped, and need not be hollow. The upper portion of the partition 3 is comprised with protuberances which would communicate with the insert 6. The plan view of the partition 4 illustrates the keying protuberances, or tabs. Media 5 which could impart, or remove moisture from the void area within the sealed vessel may be inserted into lower portion of the insert 6 or held in place between the tabs of the partition 4. The media 5 is depicted schematically.

A volumetrically adjustable insert 6 molded from a semi-flexible, food grade plastic is inserted into the void area of the vessel 1 to displace atmosphere that would cause spoilage of any contents. The top portion of the insert 6 is open ended and communicates with the inner wall near, or at, the opening of the vessel 1 to arrest its vertical position within the vessel 1. The central portion of the insert 6 is manually adjustable to compensate for the varying volume of the void area within the vessel 1. The bottom of the insert 6 is closed and may be comprised with a void to accept a media 5 which would add or remove moisture from the void area within the vessel 1. The void area at the bottom of the insert 6 used for dry contents communicates with the partition 4 for removal of same. A lid 7, manufactured from a semi-flexible, food grade plastic material, similar in characteristics to low density polypropylene, is used to seal the system and protect the contents from environmental contaminants.

FIG. 7 is an elevation view of the preferred embodiment for the insert 6 component of the system. The central portion of this insert 6 is comprised in a similar manner to that of a flexible drinking straw. Segments of the insert may be urged to reversibly collapse inside each other. FIG. 8 is an elevation view of the preferred embodiment of the insert 6 depicted in a collapsed state.

Figure 9:
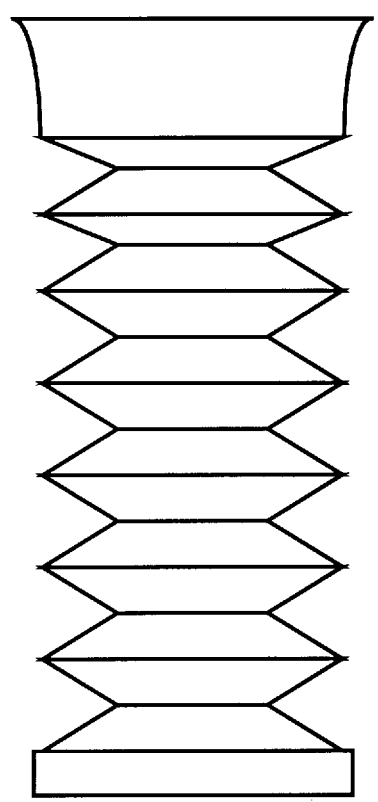
FIG. 9 is an elevation view of an alternate embodiment depicting an insert 6 combined with a partition 3.

FIG. 9 is an elevation of the preferred embodiment for the insert 6 to be used for dry contents. This insert 6 is comprised of a plurality of equal length sections which will compress against each other, and will not collapse. This illustration portrays the insert 6 and the partition 4 as a single element.

Figure 10:
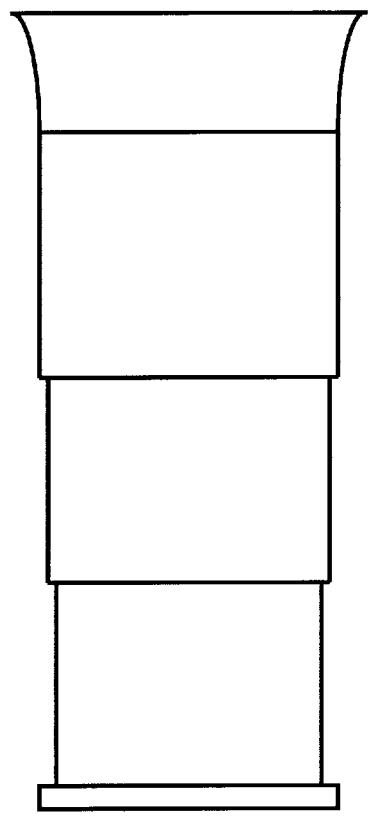
FIG. 10 is an elevation view of an alternate embodiment depicting an insert 6 suitable for use with either liquid or pour-able dry contents.

FIG. 10 is an elevation of an alternative embodiment of the insert 6. The central portion of the insert 6 is comprised of a plurality of communicating concentric walls capable of adjustment in a telescoping manner. The operating portion of this alternate embodiment may be used with either liquid or dry pour-able contents.

Figure 11:
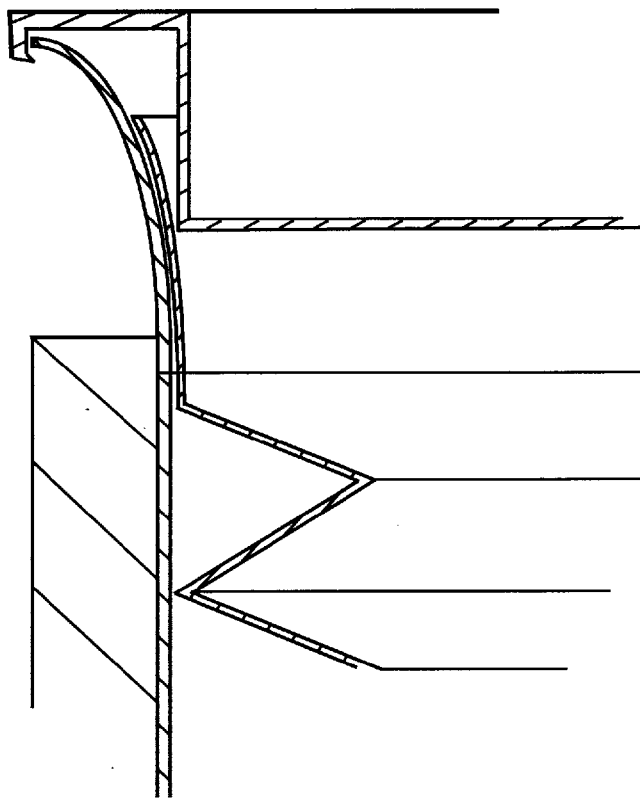
FIG. 11 is a detailed partial cross section of a portion of FIG. 3.

FIG. 11 is a partial section view of FIG. 3 depicting the communication of the lid 7, the insert 6 and the vessel 1. The lid 7 is comprised in such a manner as to urge the insert 6 against the vessel 1 wall to form a second seal.

Figure 11A:
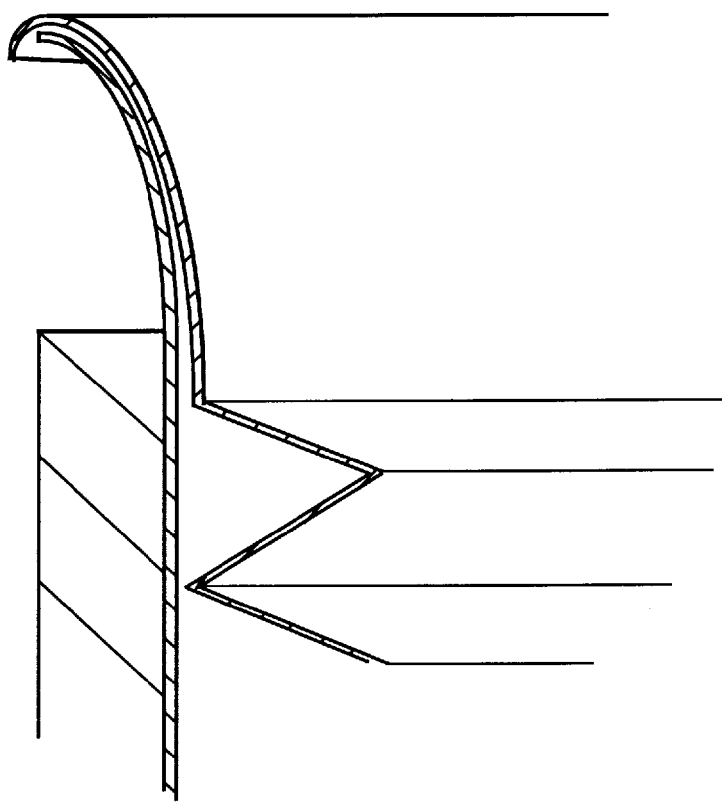
FIG. 11a is a detailed partial cross section of an alternate embodiment of FIG. 3 depicting an insert 6 combined with a lid 7.

FIG. 11a is a partial section view of FIG. 3 whereby the lid 7 and the insert 6 have been combined into one element.

Note: The combination of FIG. 9 with FIG. 11a would allow the lid 7, the insert 6, and the partition 4 to be combined into a single element.

Operation—Liquid Contents

Liquid Contents are transferred into the receptacle vessel 1 from some original packaging. A buoyant follower 2 is dropped into the liquid, and settles upon the liquid. The follower 2 corresponds very closely, but not exactly, to the horizontal cross-section of the vessel 1. In this manner, the follower 2 is free to move within the vessel 1. Both surfaces of the follower 2 are convex in shape. Any liquid will sheet-off in the narrow gap between the follower 2 and the inner wall of the vessel 1, settling below the follower 2. When the vessel 1 is tilted in a pouring manner, the liquid is readily dispensed. As the container is returned upright, the partition again separates the contents from the air above. A snap-fit lid 6, which is removable, may be placed on the opening of the vessel 1 at any time to prevent airborne contamination from insects, bacteria or other environmental factors. The lid 6 protrudes into the vessel 1 to displace void air. As contents are dispensed, the void within the vessel 1 increases. To compensate for this variance in void volume the volumetrically adjustable insert 5 is employed. The adjustment is manually performed, and is intuitive. When placed into the vessel 1, the insert should not make contact with the follower 2. Prior to dispensing, the insert 5 is manually lifted out of the vessel 1. After dispensing, the insert 5 is returned to the vessel 1.

Operation—Dry Contents

Dry contents are transferred into the vessel 1 from the original packaging. A piston-like partition 3 which closely corresponds to the horizontal cross-section of the vessel 1 is dropped onto the contents. Depending upon the volume of the void area, a snap-fit lid 6 may be used until it become necessary to employ the insert 1. In the main embodiment intended for use with dry contents the central portion of the insert 6 is a simple accordion fold, which acts in a bellows-like manner, consisting of a plurality of contiguous, opposing, conical sections of substantially equal length FIG. 9. This insert 1 need not be manually adjusted. Upon insertion, it may contact the partition 3 and fold against itself. The insert 5 and the partition 3 could communicate via opposing, yet complimentary right angled tabs. Prior to dispensing, the insert 5 would be manually rotated so as to communicate with the partition 3. In this manner, the partition 3 may be removed along with the insert 5 prior to dispensing of the contents. After dispensing, the partition 3 and the insert 5 are returned to the vessel 1.

ADVANTAGES

From the description above, a number of advantages of my receptacle system become apparent:
(a) Contents from large quantity containers may be transferred to re-usable receptacles for storage or immediate usage in more easily handled vessel.
(b) Direct exposure of the contents to the detrimental effects of ambient air is sharply minimized.
(c) Direct exposure of the contents to the detrimental effects of ambient air is sharply minimized?
(d) Exposure to airborne contaminates and effects of freely convecting air are eliminated.
(e) The amount of, and humidity content of void air within the vessel is controlled.
(f) Single usage or consumable elements are unnecessary. All components are re-usable.
(g) Independence from additional apparatus, or consumable supplies.
(h) The operation of the system is intuitive.
(i) System components require no maintenance or skill, and are easily cleaned for re-use.

CONCLUSION, RAMIFICATION AND SCOPE

Accordingly, the reader will see that all of the embodiments presented for the reusable dispensing receptacle system with preservative attributes can easily and effectively facilitate the purposes for which it is intended. Contents purchased in large quantities can be handled more easily and in a manner that is more suitable to many situations. The contents, being consumable in nature, do not require indefinite storage. The contents will however benefit for an extended duration over what has been experienced aside from this system.

Although ancillary to the basic function of this system, optional components and refinements could be incorporated. These would include; anti-static, non-stick, and/or ultra-violet inhibiting coatings, a pouring lip, an insulating or protective vessel sleeve 7. The insert 5 may be filled with hot water or an ice-salt-water mixture and immersed into the liquid contents to warm or cool the contents. While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

Background—Advantages

The introduction of a receptacle system incorporating a follower and a volumetrically adjustable insert that communicates with a receptacle and a closure is an effective, new combination. The most significant advantage of this combination is the increased storage and usage duration of a product after an original container is first opened. This is accomplished by limiting the amount of air in direct contact with the contents, and reducing by displacement the volume of air in the void space within the receptacle. Simplicity of design and ease of operation, as seen in the proposed embodiments, lessen manufacturing costs and promote ready acceptance in the marketplace. The elimination of consumable or one time use elements is also of great advantage. Ease of cleaning for repeated usage has always been a hallmark of useful products that have achieved acceptance in the marketplace.

With regard to the use of this system a particularly surprising and unexpected result was discovered. After a bottle of wine was transferred, stored for five weeks and dispensed, the flavor of the wine improved when compared with wine from another freshly opened bottle. The flavor and aroma also improved over that of a wine that was stored in an identical receptacle for a period of ten days. The combination of the follower creating a near perfect barrier to ambient air, along with the volumetric insert displacing most (but not all) of the void air in the vessel, created conditions that promoted controlled aeration of the wine. There was just enough oxygen and the exposure to oxygen allowed the wine to breathe, but not in an amount that impeded the ability of this combination to preserve drinkability over this extended storage duration. U.S. Pat. No. 5,713,263 to Burks III, Vance R. (1998) provides good background for the benefits of the aeration of wine. Harold Grossman, in his highly respected publication states: "Very old red wines should be decanted to draw off the clear wine and leave any sediment there might be in the bottle. Aeration is the second good reason for decanting. Decanting is particularly advisable if the wine is young, or from an off year. Contact with the air expands the bouquet and enhances the enjoyment of the wine by permitting any undesirable volatile aromas to dissipate". The reusable dispensing receptacle system is also a means for enjoying the improvement in flavor that a decanter affords, while greatly prolonging the useful shelf life of this fragile product.

Personal experience with all four of the preservation methods showed that a combination of more than one approach might provide acceptable results in a configuration and scale that is easily attainable by the average person. By initially combining a vessel and a follower of suitable diameter, and prohibiting the convection of ambient air by sealing the vessel with a removable closure, the drink-ability of an opened bottle of wine was extended for a period of one to two weeks. During this time period, wine would evaporate from the gap between the vessel and the follower and form a crust. The need to reduce the volume of air that would become moisture saturated became apparent. Simple displacement of the air proved simpler and at least as effective as evacuating the air using a pump. Displacement is deemed safer and more appropriate for the larger sized openings of thinner walled receptacles. Additionally, displacement eliminates the need for an additional, separate pumping apparatus.

When reduced to practice, this new combination proved that fragile liquid contents, such as wine, were capable of being stored successfully at room temperature for a surprisingly extended period, ranging from four to six weeks.

Interestingly, U.S. Pat. No. 3,231,139 to Bouet, Bernard (1966) for Dispensing Containers teaches against "plastic containers of the accordion type". However, the same drawbacks presented in his reasoning (for a container body) are in fact advantages when applied to an air-displacing volumetric insert within a container. This patented container demonstrates a bottom-up approach to partitioning versus the top-down follower asserted in this application. The means by which contents are preserved is not limited to the Receptacle classification and may be incorporated into the design of original shipping, marketing and storage containers.

I claim:

1. In combination:

a re-usable, rigid, re-sealable, non gas permeable, storage and dispensing vessel of predetermined volume, constructed from plastic, glass, lead crystal, ceramic, coated metal, treated wood or other suitable material, or combination thereof, said vessel being impervious to ultra violet light by means of material composition or coating applied thereto, said vessel is comprised of a lower reservoir portion and a contiguous dispensing and sealing portion, said reservoir portion comprising a body part closed at one end and bounded peripherally by a perpendicular wall of substantially uniform cross section, said dispensing portion terminates at the open end as a means of communication, said vessel stores, dispenses and acts as a partial means to preserve contents from spoilage, a re-usable partition constructed from plastic, ceramic, treated wood, or other suitable material or combination thereof, said partition is impervious to ultra violet light by material composition or coating applied thereto, said partition is slightly smaller in horizontal cross section than said reservoir portion of said vessel, said partition rests upon the surface of said contents and substantially cover same as a partial means to preserve said contents from spoilage, a re-usable replaceable lid constructed from plastic, said lid is comprised with one or more cup-like protrusions, said protrusion or protrusions emanate centrally from the horizontal plane of said lid outward, said lid communicates with the terminal end of said vessel as a reversibly sealing means, said lid acts as a partial means to preserve said contents from spoilage, a re-usable adjustable void air displacement insert disposed within said vessel defined as a means to displace ever-present atmosphere above said partition within said vessel, said insert is molded from semi-flexible plastic, the upper portion of said insert corresponds to and communicates with the upper portion of said vessel or said lid or both in a reversible sealing manner, the lower portion of said insert is adapted to adjust vertically to compensate for varying volume of said contents below said partition acting as a partial means to preserve said contents from spoilage, said insert is combined with said partition in manufacture.

2. In combination:

a re-usable, rigid, re-sealable, non gas permeable, storage and dispensing vessel of predetermined volume, constructed from plastic, glass, lead crystal, ceramic, coated metal, treated wood or other suitable material, or combination thereof, said vessel being impervious to ultra violet light by means of material composition or coating applied thereto, said vessel is comprised of a lower reservoir portion and a contiguous dispensing and sealing portion, said reservoir portion comprising a body part closed at one end and bounded peripherally by a perpendicular wall of substantially uniform cross section, said dispensing portion is comprised of excurvate walls terminating at the open end as a means of communication, said vessel stores and dispenses liquid contents acting as a partial means to preserve said contents from spoilage, a re-usable, buoyant, non gas permeable follower, said follower is constructed from plastic, ceramic, treated wood, other suitable non-staining material or combination thereof, said follower is buoyant by means of material composition or physical configuration, said follower is impervious to ultra violet light by material composition or coating applied thereto, said follower is slightly smaller in horizontal cross section than said reservoir portion of said vessel, said follower is comprised of two surfaces, said surfaces are relationally interchangeable upon the contents, said follower having thin marginal edge whereby said follower will remain in a horizontal free floating position when said vessel is tilted for pouring, said follower is adapted to gravitationally shed said contents from the upper surface when buoyant upon said contents, said follower is adapted to come to rest upon the surface of said liquid and substantially cover same as a partial means to preserve said contents from spoilage, a re-usable adjustable void air displacement insert disposed within said vessel defined as a means to displace ever-present atmosphere above said follower within said vessel, said insert is molded from semi-flexible plastic, the upper portion of said insert corresponds to and communicates with the upper portion of said vessel or said lid or both in a reversible sealing manner, the lower portion of said insert is adapted to adjust vertically to compensate for varying volume of said contents below said partition acting as a partial means to preserve said contents from spoilage, a re-usable replaceable lid constructed from plastic, said lid is comprised with a cup-like protrusion, said protrusion emanates centrally from the horizontal plane of said lid downward, upon employment said protrusion displaces atmosphere from within said vessel, said protrusion is further adapted to communicate with said insert to urge said insert against said vessel when employed as a partial means to preserve said contents from spoilage, said lid further communicates with the terminating end of said vessel as a reversible sealing means, said lid is a partial means to preserve said contents from spoilage, said lid is combined in manufacture with said insert.

3. In combination:

a re-usable, rigid, re-sealable, non gas permeable, storage and dispensing vessel of predetermined volume, constructed from plastic, glass, lead crystal, ceramic, coated metal, treated wood or other suitable material, or combination thereof, said vessel being impervious to ultra violet light by means of material composition or coating applied thereto, said vessel is comprised of a lower reservoir portion and a contiguous dispensing and sealing portion, said reservoir portion comprising a body part closed at one end and bounded peripherally by a perpendicular wall of substantially uniform cross section, said dispensing portion terminates at the open end as a means of communication, said vessel stores and dispenses non-liquid pour-able contents acting as a partial means to preserve said contents from spoilage, a re-usable partition constructed from plastic, ceramic, treated wood, or other suitable material or combination thereof, said partition is impervious to ultra violet light by material composition or coating applied thereto, said partition rests upon the surface of the contents, the top of said partition is adapted with one or more upward facing protuberances said protuberance acting as a means of communication, said partition is slightly smaller in horizontal cross section than said reservoir portion of said vessel, said partition is adapted to substantially cover said contents within said vessel as a partial means to preserve said contents from spoilage, a re-usable volumetrically adjustable vessel insert as a means to displace atmosphere above said partition within said vessel as a partial means to preserve said contents from spoilage, said insert is constructed from semi-flexible plastic, said insert is open at the top, adjustable in the middle, and closed at the bottom, said top portion corresponds to and communicates with either said vessel, said lid or both selectively in a reversibly sealing manner, said middle portion of said insert is adapted to adjust vertically as a means to compensate for varying volume of said contents below said partition, said bottom portion adapted with a cavity as a means of communication with said protuberance of said partition for removal of same from said vessel prior to dispensing said contents, said insert is combined in manufacture with said partition, a re-usable replaceable lid, said lid is constructed plastic, said lid is comprised with one or more cup-like protuberances which displace atmosphere from within said vessel, said protuberances emanate centrally from the horizontal plane of said lid outward, said protuberances are adapted to communicate with said insert, said lid further communicates with said terminating end of said vessel as a reversible sealing means, said lid is a partial means to preserve said contents from spoilage.

4. In combination:

a re-usable, rigid, non gas permeable, reseal-able, storage and dispensing vessel of predetermined volume, said vessel is constructed from lead crystal, glass, plastic, coated metal, ceramic, treated wood, other suitable non-staining material, or combination thereof, said vessel being impervious to ultra violet light by means of material composition or coating applied thereto, said vessel is comprised of a lower reservoir portion and a contiguous dispensing and sealing portion, said reservoir portion comprising a body part closed at one end and bounded peripherally by a perpendicular wall of substantially uniform cross section, said dispensing portion is comprised of excurvate wall terminating at the open end, said termination is comprised of a beaded edge about the periphery of said opening, said vessel is partially surrounded by a housing acting as a gripping means, said vessel contains, stores, and dispenses liquid contents, said vessel is a partial means to preserve said contents from spoilage, a re-usable, buoyant, non gas permeable follower, said follower is constructed from plastic, ceramic, treated wood, other suitable non-staining material or combination thereof, said follower is buoyant by means of material composition or physical configuration, said follower is impervious to ultra violet light by material composition or coating applied thereto, said follower is slightly smaller in horizontal cross section than said reservoir portion of said vessel, said follower is comprised of two surfaces, said surfaces are relationally interchangeable upon the contents, said follower having thin marginal edge whereby said follower will remain in a horizontal free floating position when said vessel is tilted for pouring, said follower is adapted to gravitationally shed said contents from the upper surface when buoyant upon said contents, said follower is adapted to come to rest upon the surface of the liquid and substantially cover same as a partial means to preserve said contents from spoilage, a re-usable volumetrically adjustable vessel insert as a means to displace atmosphere above said follower within said vessel as a partial means to preserve said contents from spoilage, said insert is constructed from semi-flexible plastic, said insert is open at the top and closed at the bottom, the upper portion of said insert corresponds to and communicates by means of gravity with said excurvate portion of said vessel, the lower portion of said insert is adapted to adjust vertically as a means to compensate for varying volume of said contents below said follower within said vessel, the bottom of said insert further comprised with a cavity, an atmospheric humidification media insert, said media communicates with said cavity, media acting as a means to impart moisture, a re-usable replaceable lid, said lid is constructed from semi-flexible plastic, said lid is comprised with a cup-like protrusion, said protrusion emanates centrally from the horizontal plane of said lid downward, upon employment said protrusion displaces atmosphere from within said vessel, said protrusion is further adapted to communicate with the inner wall of said insert to urge said insert against said vessel when employed as a partial means to preserve said contents from spoilage, said lid further communicates with said beaded edge of said vessel opening in a frictional manner as a reversible sealing means, said lid is a partial means to preserve said contents from spoilage.

5. In combination:

a re-usable, rigid, non gas permeable, reseal-able storage and dispensing vessel of predetermined volume, said vessel is constructed from lead crystal, glass, plastic, coated metal, ceramic, treated wood, other suitable non-staining material, or combination thereof, said vessel being impervious to ultra violet light by means of material composition or coating applied thereto, said vessel is comprised of a lower reservoir portion and a contiguous dispensing and sealing portion, said reservoir portion comprising a body part closed at one end and bounded peripherally by a perpendicular wall of substantially uniform cross section, terminating at the open end, said open end is comprised as a means of communication, said vessel is partially surrounded by a housing, said housing acting as a gripping means, said vessel contains, stores, and dispenses non-liquid pour-able contents, said vessel is a partial means to preserve said contents from spoilage, a re-usable, non-gas permeable partition, said partition is substantially piston-like, said partition is constructed from plastic, ceramic, treated wood, other suitable non-staining material or combination thereof, said partition is impervious to ultra violet light by material composition or coating applied thereto, said partition is slightly smaller in horizontal cross section than said reservoir portion of said vessel, the top of said partition is adapted with one or more upward facing protuberances said protuberances acting as a means of communication, said partition is adapted to substantially cover said contents within said vessel as a partial means to preserve said contents from spoilage, a re-usable volumetrically adjustable vessel insert as a means to displace atmosphere above said partition within said vessel as a partial means to preserve said contents from spoilage, said insert is constructed from semi-flexible plastic, said insert is open at the top, adjustable in the middle, and closed at the bottom, said top portion corresponds to and communicates with either said vessel, said lid or both selectively in a reversibly sealing manner, said middle portion of said insert is adapted to adjust vertically as a means to compensate for varying volume of said contents below said partition within said vessel, said bottom portion adapted with a cavity as a means of communication with said protuberance of said partition for removal of same from said vessel prior to dispensing said contents, the bottom of said insert further comprised with a cavity, an atmospheric humidification media insert, said media communicates with and is retained by said insert, said media being a means to impart, remove or stabilize humidity within said vessel, a re-usable replaceable lid, said lid is constructed from plastic, said lid is comprised with one or more cup-like protuberances, said protuberances emanate centrally from the horizontal plane of said lid outward, said protuberances are adapted to communicate with said insert, said lid further communicates with said open end of said vessel as a reversible sealing means, said lid is a partial means to preserve said contents from spoilage.

6. A combination according to claim 1, the bottom portion of said insert is comprised with a cavity, an atmospheric media insert, said media communicates with and is retained by said cavity as a means to moderate humidity levels within said vessel.

7. A combination according to claim 2, the bottom portion of said insert is comprised with a cavity, an atmospheric media insert, said media communicates with and is retained by said cavity as a means to impart humidity within said vessel.

8. A combination according to claim 2, said vessel is partially surrounded by a housing, said housing acting as a gripping means.

9. A combination according to claim 2, said lid said insert and said follower are combined in manufacture.

10. A combination according to claim 3, the bottom portion of said partition is comprised with a cavity, an atmospheric media insert, said media communicates with and is retained by said cavity as a means to moderate humidity levels within said vessel.

11. A combination according to claim 3, the vessel is partially surrounded by a housing, said housing acting as a gripping means.

12. A combination according to claim 3, said lid said insert and said partition are combined in manufacture.

13. A combination according to claim 1, said vessel is defined as the uncovered original packaging of said contents.

14. A combination according to claim 2, said vessel is defined as the uncovered original packaging of said contents.

15. A combination according to claim 3, said vessel is defined as the uncovered original packaging of said contents.

* * * * *